United States Patent [19]

Stettmaier et al.

[11] 4,197,587

[45] Apr. 8, 1980

[54] CORRECTION CIRCUIT FOR ARITHMETIC OPERATIONS WITH NON-HEXADECIMAL OPERANDS IN HEXADECIMAL ARITHMETIC UNITS

[75] Inventors: Helmut Stettmaier, Olching; Werner Boening, Munich, both of Fed. Rep. of Germany

[73] Assignee: Siemens Aktiengesellschaft, Berlin & Munich, Fed. Rep. of Germany

[21] Appl. No.: 931,476

[22] Filed: Aug. 7, 1978

[30] Foreign Application Priority Data

Aug. 19, 1977 [DE] Fed. Rep. of Germany ....... 2737483

[51] Int. Cl.$^2$ .............................................. G06F 7/50
[52] U.S. Cl. .................................................... 364/771
[58] Field of Search ................................ 364/771, 772

[56] References Cited

U.S. PATENT DOCUMENTS

| | | | |
|---|---|---|---|
| 3,508,037 | 4/1970 | Collins et al. | 364/771 |
| 3,584,206 | 6/1971 | Evans | 364/772 |
| 3,958,112 | 5/1976 | Miller | 364/771 |

*Primary Examiner*—David H. Malzahn
*Attorney, Agent, or Firm*—Hill, Van Santen, Steadman, Chiara & Simpson

[57] ABSTRACT

A correction circuit for arithmetic operations with non-hexadecimal operands in hexadecimal arithmetic units incorporates a full hexadecimal adder for each four-bit word of the operands, a carry storage register coupled to a carry output of the full adder and to its own output, and a coupling circuit for selectively coupling to an operand input of the full adder an operand or a correction factor or the output of the carry storage register. The adder has a second operand input and an output which is connected to a memory for storing a sum output of the adder. The coupling circuits are controllable so that a carry produced by arithmetic operations involving two operands is stored in the carry storage register. In a subsequent arithmetic operation involving the sum of the first arithmetic opration and a correction factor, the carry storage register is connected to its own output and to the carry output of the adder. In a third arithmetic operation the output of the carry storage register is connected to the operand input which corresponds to the correction factor while the correction factor is being added or subtracted to the previously produced sum.

7 Claims, 4 Drawing Figures

CORRECTION CIRCUIT FOR ARITHMETIC OPERATIONS WITH NON-HEXADECIMAL OPERANDS IN HEXADECIMAL ARITHMETIC UNITS

BACKGROUND

1. Field of the Invention

The present invention relates to an arithmetic correction circuit and more particularly to such a circuit for correcting the results of arithmetic operations on non-hexadecimal operands using hexadecimal arithmetic units.

2. The Prior Art

Micro-processors with hexadecimal arithmetic units have already become known, in which a correction is made for correcting the sum or difference resulting from an arithmetic operation. Typically a logic network is employed for examining the output of the hexadecimal adder, and providing for an addition of a correction factor which is equal to the difference between 16 and the base of the non-hexadecimal system which is being used. A separate logic unit is used for each four-bit word, and when eight bits are employed, the examination is cascaded. This arrangement requires a relatively large amount of hardware, so that the hardware expense is relatively high.

In other micro-processors, one of the operands has a sum added to it which is equal to the difference between 16 and the base of the non-hexadecimal system, before arithmetic operations are performed. Pseudo words or four-bit words corresponding to non-existent combinations of bits in the non-hexadecimal system can be recognized by examination of a carry bit produced during the arithmetic operation. Sometimes, when the addition of the summing factor is not appropriate, it is compensated for by addition of yet another factor corresponding to the base of the non-hexadecimal system. This system requires three commands, including two correction commands.

It is therefore desirable to provide a simpler arrangement for allowing a correction to be made when hexadecimal arithmetic units are used for performing arithmetic operations on non-hexadecimal operands.

SUMMARY OF THE INVENTION

It is a principal object of the present invention to provide a correction circuit which is capable of high speed and which employs a minimum of hardware, and requires a minimum number of commands for its operation.

In one embodiment there is provided by the present invention a correction circuit having a carry storage register coupled, by the first coupling circuit, to the carry output of a full hexadecimal adder, and to its own output. The operand input of the full adder is coupled by means of a second coupling circuit to a source of an operand or alternatively to a source of a correction factor, and to the output of the carry storage register. The other operand input of the full adder is coupled to a source of a further operand or to a memory in which is stored the result of a previous arithmetic process (addition or subtraction). The first and second coupling circuits are switchable by means of control inputs, so that in a first switching state, during an addition or subtraction operation of two operands, the input of the carry storage register is coupled to the carry output of the adder. In a second switching state, on an addition or subtraction operation of the correction factor and of the sum or difference resulting from the first arithmetic operation, the input of the carry storage register is coupled not only to the carry output of the adder but also to its own output. In a third switching state the output of the carry storage register is coupled to the operand input of the adder which supplies the correction factor, when the correction factor and the sum of a previous arithmetic operation are presented to the operand inputs of the adder.

In the arrangement of the present invention, the correction factor, which is equal to the difference between 16 (the base of the hexadecimal system) and the base of the non-hexadecimal system, can be programmed to allow calculation in any number system having a base equal to or less than 16.

In a specific embodiment of the present invention, a determination of whether the sum or difference resulting from the arithmetic operation involving two operands comprises a trial addition of the correction factor. The result of the trial addition is ignored except for its carry output, and a final correction is made if necessary by performing a subsequent arithmetic operation of the correction factor and the sum or difference resulting from the first arithmetic operation.

SUMMARY OF THE DRAWINGS

Reference will now be made to the accompanying drawings in which.

DESCRIPTION OF THE PREFERRED EMBODIMENTS

Figure 1:
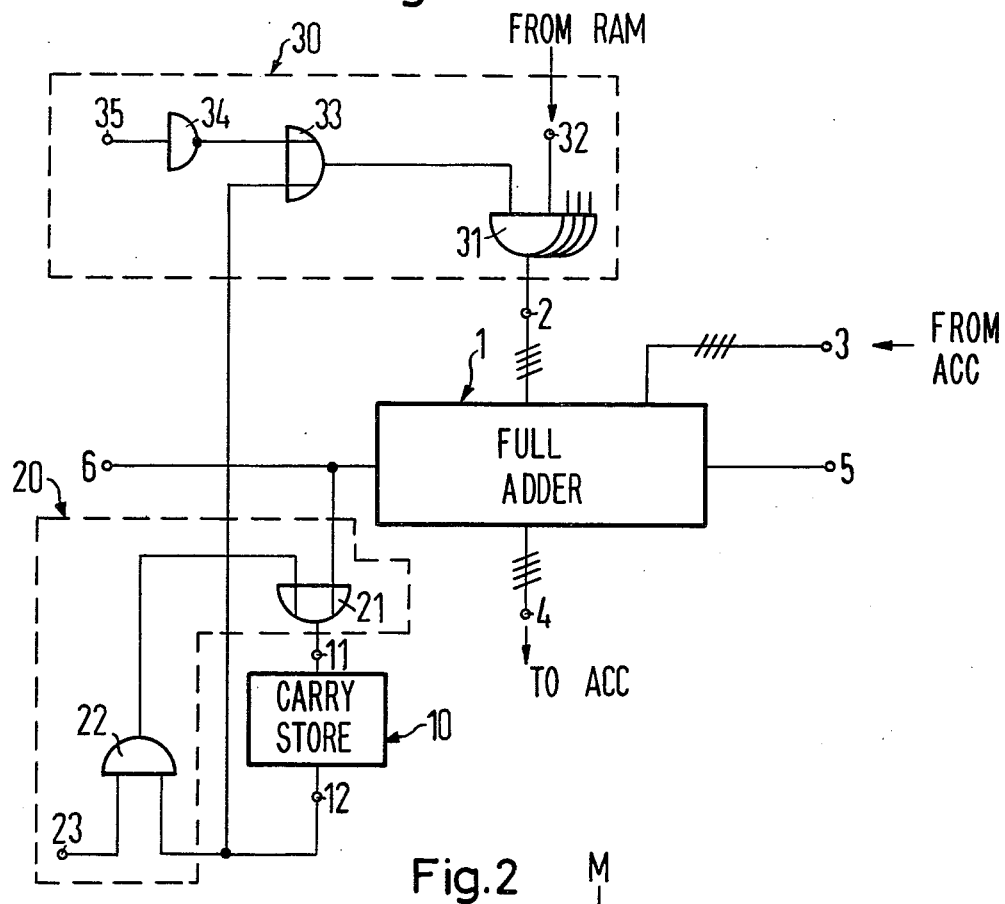
FIG. 1 is a functional block diagram of an illustrative embodiment of the present invention.

Referring now to FIG. 1, a full adder 1 is illustrated, which is part of a hexadecimal arithmetic unit of a micro-processor. The adder 1 processes simultaneously two four-bit words which form two non-hexadecimal operands, supplied to the two operand inputs 2 and 3. Inputs 2 and 3 each have four lines, one for each bit, which fact is indicated in FIG. 1 by the four transverse strokes on the lines connected to the inputs 2 and 3. A four-bit sum is produced at an output 4, and the four lines of this output are indicated in similar fashion.

A terminal 5 is provided for receiving a carry in signal from a lower order stage, if any, and an output 6 provides a carry output resulting from operation of the adder 1. It is supplied to the carry in input of an adder provided for a higher order stage, if any.

As is common in many micro-processors, one of the operands is supplied by a working memory (RAM) of a central arithmetic unit and is fed to a terminal 32. A further input is supplied to the input terminal 3 from an accumulator (ACC) of the central arithmetic unit. The sum or difference resulting from operation of the adder 1 is supplied as an input to the accumulator ACC via terminal 4.

A first coupling circuit indicated by dashed line 20, incorporates an OR gate 21 having one input connected to the carry output of the adder 1, and its other input connected to the output of an AND gate 22.

The output of the OR gate 21 is connected to the input 11 of a carry storage register 10, the output 12 of which is connected to one input of the AND gate 22.

The other input of the AND gate 22 is connected to a terminal 23. A control voltage is supplied to the terminal 23 as described hereinafter.

A second coupling circuit indicated by dashed line 30 incorporates a series of AND gates 31, each of which has one input connected to one of the four lines from the output of the RAM. The other input of each of the four AND gates 31 is connected to the output of an OR gate 33. One input of the OR gate 33 is connected to the output 12 of the carry storage register 10, and the other input is connected to a terminal 35 through an inverter 34. A control signal is supplied to the terminal 35 as described hereinbelow.

When hexadecimal numbers are added or subtracted in the adder 1 operation takes place in the normal way familiar to those skilled in the art. When non-hexadecimal operands are to be added or subtracted, two steps are required namely a first step involving a hexadecimal addition (or subtraction) and a second step involving an arithmetic correction operation. For simplicity, the description hereinafter will describe an arithmetic addition operation, but it will be understood that the subtraction operation is also provided for by the present invention.

When two operands M and N are to be added, the hexadecimal result is designated X. The arithmetic correction which is required, when M and N are non-hexadecimal operands, requires the addition of a correction factor K, with the final result designated by T. In the following description the base of the non-hexadecimal number system will be designated by B.

In a non-hexadecimal number system having a base B less than 16, the B numbers of the non-hexadecimal system correspond to the four-bit words of the hexadecimal system from zero through $B-1$. The other words of the hexadecimal system are not used for the representation of digits in the non-hexadecimal system and are called pseudo words. There are $16-B$ pseudo words. For example in the decimal system, the four-bit words for the numbers 10 through 15 are pseudo words.

The result of a hexadecimal addition of two operands in a base B can result in one of three conditions.

A. The sum X is not a pseudo word and no carry U is produced.

B. X is not a pseudo word and a carry U is produced.

C. X is a pseudo word and a carry U does not occur.

In case B, the sum is too small by a correction factor equal to $16-B$. Therefor in order to obtain a correct result a word corresponding to $16-B$ must be added, which will produce no carry.

In case C, the correction factor must also be added for the correction, and a carry will be produced by this addition. In either case when the word equal to $16-B$ is added, an intermediate result S is formed.

In case A no correction is necessary, except sometimes in the case when a carry results from the addition of the next lower order of the 4-bit operand words, i.e. case C took place there.

In accordance with the present invention, the correction operation is carried out in two stages. In the first stage a trial addition takes place, so that $S_i$, $V_i = X_i + (16-B) + V_{i-1}$, where the subscript indicates the order of the 4-bit-words, and a carry resulting from the trial addition is designated V. $V_{i-1}$ designates the carry from the trial addition of the lower order 4-bit-word of the operands. The sum $S_i$ produced by the trial addition is ignored, but the carry over $V_i$ is stored for later use. The result of the trial addition makes it clear whether an addition of the correction factor K (equal to $16-B$) is required in order to complete the addition. If there is a carry either from the trial addition, or from the lower order 4-bit-word during hexadecimal addition, a correction must take place. In this event the final result $T_i$ must be formed as a result of the following: $T_i = X_i + K_i + W_{i-1}$ where $W_{i-1}$ designates a carry formed by the lower order 4-bit-word during the final correction.

The apparatus of FIG. 1 performs these operations in the following way.

Figure 2:
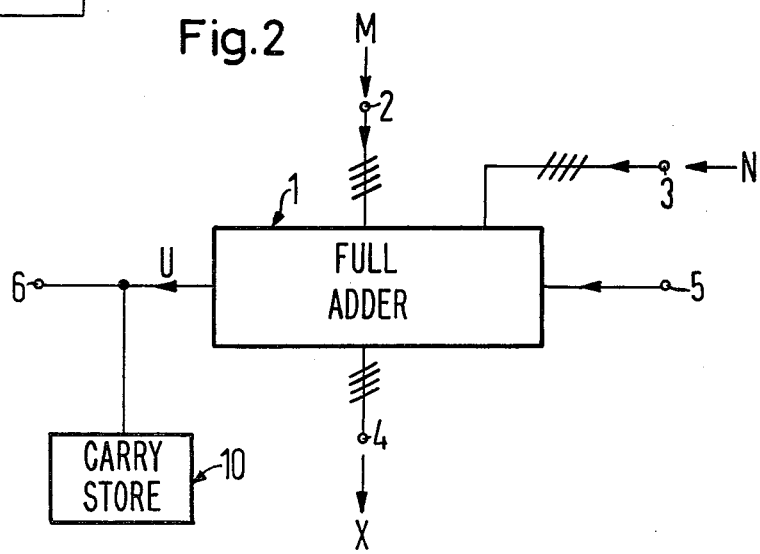
FIGS. 2 to 4 are diagrammatic illustrations of the condition of the apparatus of FIG. 1 during the various operations which take place during the correction.

First, the operands M and N are added while being connected to the input terminals 32 and 3. Signals are provided to the control inputs 23 and 35 so that the AND gate 22 is blocked and the AND gates 31 are enabled by signal from the inverter 34 and the OR gate 33. The carry storage register 10 is connected to the carry output 6 of the adder and the hexadecimal sum X appears at the output 4 of the adder, with a carry U being stored in the carry storage register 10. This condition is illustrated in FIG. 2.

Figure 3:
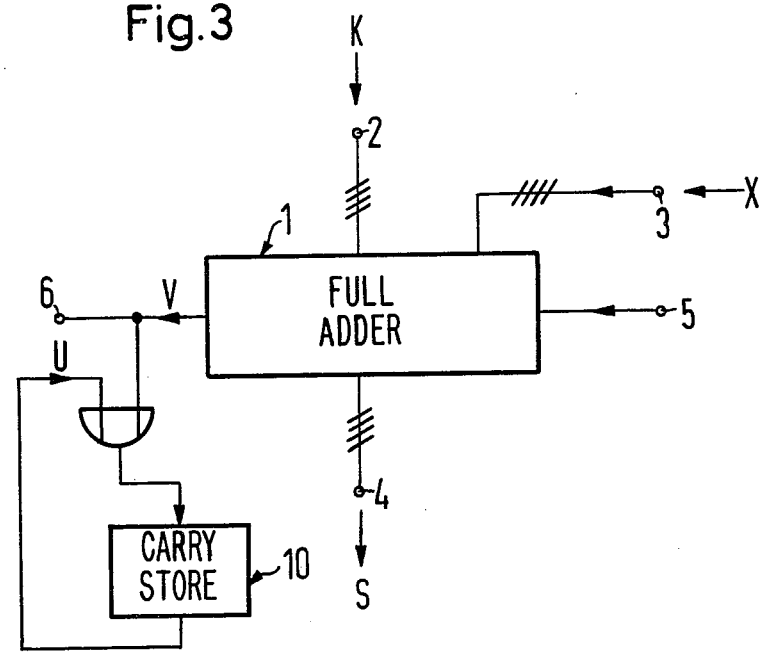

In a second step, the result of the hexadecimal addition, stored in the accumulator (ACC) is supplied to the operand input 3 of the adder 1 while the correction factor K (equal to $16-B$) comes from the RAM and is supplied to terminal 32. The control signals 23 and 35 are such that the AND gate 22 is enabled, connecting the output of the storage register 10 to its input through the OR gate 21, and the AND gates 31 are enabled by signal supplied through inverter 34 and OR gate 33. Accordingly the carry storage register 10 maintains storage of the carry U formed during hexadecimal addition. It also receives in storage a carry V resulting from the trial addition. During the trial addition the sum S is ignored. This condition is illustrated in FIG. 3.

Figure 4:
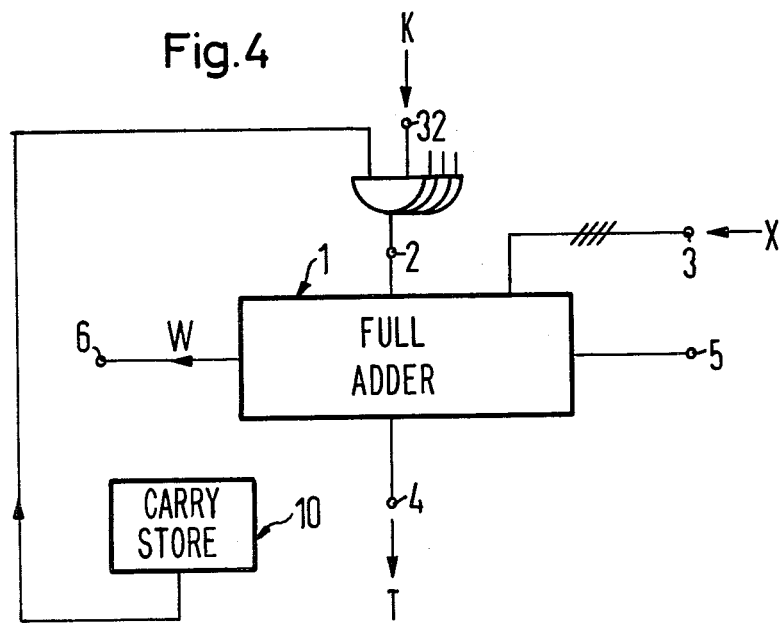

In a final step, the correction factor K is added to the sum X stored in the accumulator and presented to operand input 3, and the control signal supplied to the terminals 23 and 35 are such to disable the AND gate 22, and enable the AND gates 33 by a signal from the output of the storage register 10 through the OR gate 33 only if the storage register 10 stores a carry bit resulting from the hexadecimal addition or the trial addition. This condition is illustrated in FIG. 4.

The storage register 10 of the apparatus of FIG. 1 is preferably a master-slave flip-flop, of conventional construction, and may constitute a D type flip-flop, which is set or reset at the time of a clock pulse, in accordance with a signal applied to the input 11. Alternatively, an RS type flip-flop may be used, which requires no clock signal. In this event, means is provided for resetting the flip-flop subsequent to a correction and before a succeeding hexadecimal arithmetic operation. A flip-flop is provided for each order of the accumulator, so that the carry output of each order may be stored in the manner described above.

It is not necessary that each four-bit word defining one order of a number have the same base B. For example in the case of a time indication, four different digit systems may be involved in a four digit number. Here the base 2 is involved to discriminate between A.M. and P.M., base 12 of the duodecimal system is involved for representing the 12 hours of half a day, base 6 is used for the tens order of the minutes and base 10 is used for the units order of the minutes. Notwithstanding the different orders used for the different digits, the apparatus of the present invention can accomplish the required connection for permitting arithmetic operations on time indications while using hexadecimal adders.

Since the details of the RAM, the accumulator and the source of constants (for correction factors) are well known to those skilled in the art, they are not explained in detail herein.

From the foregoing it will be apparent to those skilled in the art that the present invention forms an economical and efficient mechanism for making corrections required when non-hexadecimal operands are used with arithmetic operations in hexadecimal units. Various modifications and additions may be made by those skilled in the art without departing from the essential features of novelty involved, which are intended to be defined and secured by the appended claims.

What is claimed is:

1. A correction circuit for addition or subtraction operations with non-hexadecimal operands in hexadecimal arithmetic units employing an operand source for supplying signals representative of first and second operands, correction factor source means for supplying signals representative of a correction factor, one full parallel adder for each four-bit word of the operands, said adder having two operand inputs, a sum output, and a carry output and memory means connected to said adder for storing a result produced by said adder, comprising; in combination, a carry storage register, a first coupling circuit, connecting means for connecting said first coupling circuit to the input of said register, connecting means for connecting said first coupling circuit to the output of said register, connecting means for connecting said first coupling circuit to the carry output of said adder, a second coupling circuit, connecting means for connecting said second coupling circuit to an operand input of said adder, connecting means for connecting said second coupling circuit selectively to said operand source and selectively to said correction factor source means, connecting means for connecting said second coupling circuit to the output of said carry storage register, means for connecting the other operand input of said adder selectively to said operand source and selectively to said memory means storing the result of a hexadecimal addition or subtraction of said operands, said first and second coupling circuits having control inputs adapted for connection to control signals, whereby, in a first switching state, on a hexadecimal addition or subtraction operation of two operands, the input of the carry storage register is coupled to the carry output of the adder, in a second switching state, on an addition or subtraction operation of the correction factor and of the result of a prior hexadecimal operation, the input of the carry storage register is coupled not only to the carry output of the adder but also to the storage register output, and in a third switching state, the output of the carry storage register is connected to the operand input of the adder with said correction factor, when said correction factor and said result are presented to the operand inputs of said adder.

2. The correction circuit according to claim 1, wherein said first coupling circuit is formed by the combination of an OR gate and an AND gate said OR gate having one input coupled to the carry output of said adder, and another input coupled to the output of said AND gate, the output of said OR gate being connected to the input of the carry storage register, and another input of said AND gate being connected to a control input.

3. The correction circuit according to claim 2, wherein said first, second and third switching state of the first coupling circuit are defined by a signal, in each case, at its control input which blocks said AND gate for the first switching state, unblocks it for the second switching state and blocks it for the third switching state.

4. The correction circuit according to claim 1, wherein said second coupling circuit is formed by the combination of an AND gate, an OR gate and an inverter, the output of said AND gate being coupled to the one operand input of said adder, one input being coupled selectively to the source of an operand and selectively to the source of said correction factor, and another input being coupled to the output of the OR gate, said OR gate having one input coupled to the output of the carry storage register and another input coupled to the output of the inverter, the input of the inverter being connected to a control input.

5. The correction circuit according to claim 4, wherein said first, second and third switching state of the second coupling circuit is defined by a control signal which unblocks the AND gate in the first and second switching state independently of the signal at the output of the carry storage register, and, in the third switching state, said AND gate is unblocked only as a function of the signal at the output of the carry storage register.

6. The correction circuit according to claim 1, wherein said carry storage register is a master-slave flip-flop.

7. The correction circuit according to claim 1, wherein said correction factor is equal to the difference of base 16 of the hexadecimal number system and the base B of the non-hexadecimal number system.

* * * * *